Aug. 13, 1968 E. J. HAMMOND 3,396,981
CHUCKING APPARATUS

Filed Jan. 18, 1965 5 Sheets-Sheet 1

INVENTOR.
EARL J. HAMMOND
BY
*Learman, Learman & McCulloch*
ATTORNEYS

INVENTOR.
EARL J. HAMMOND

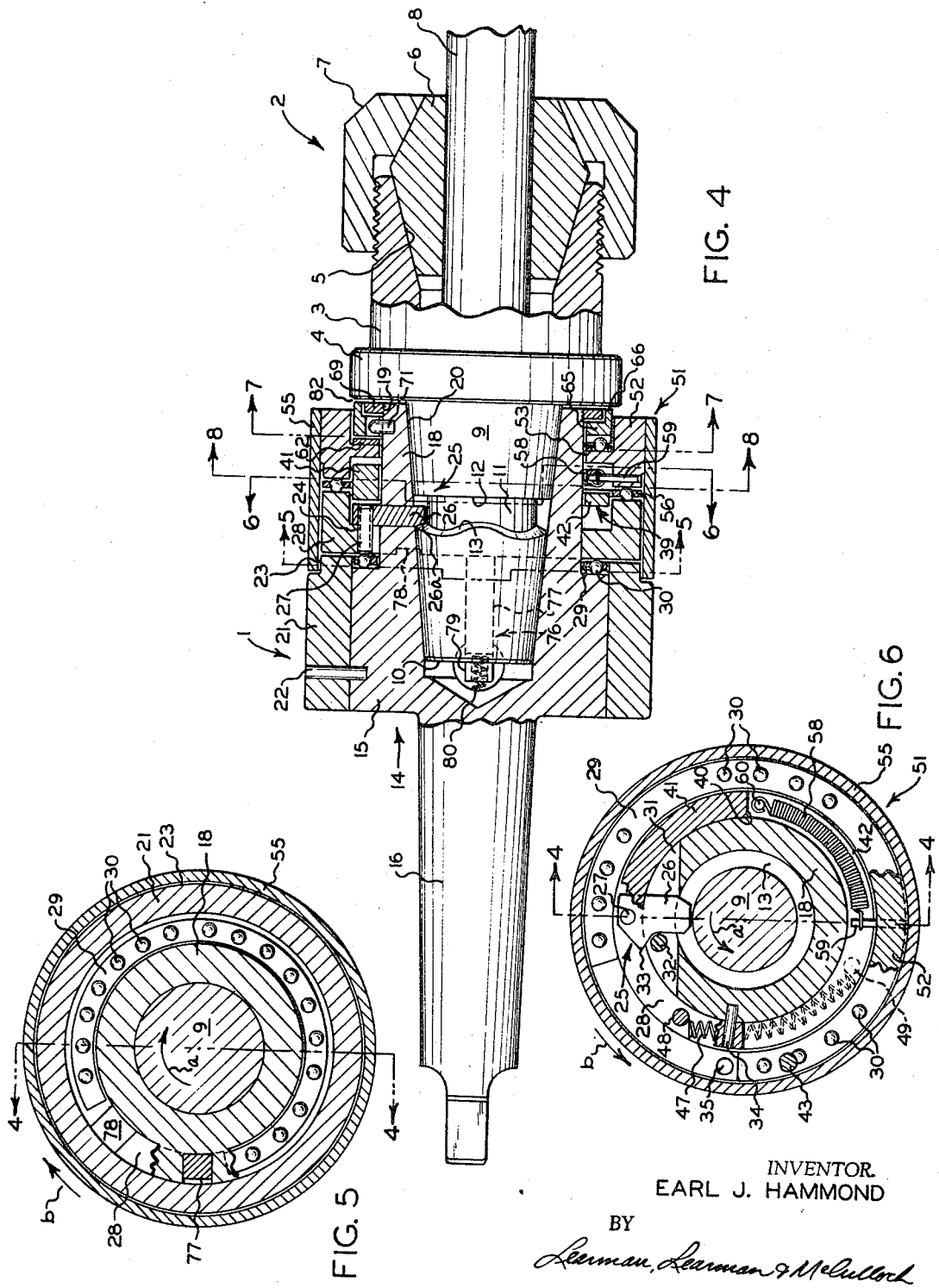

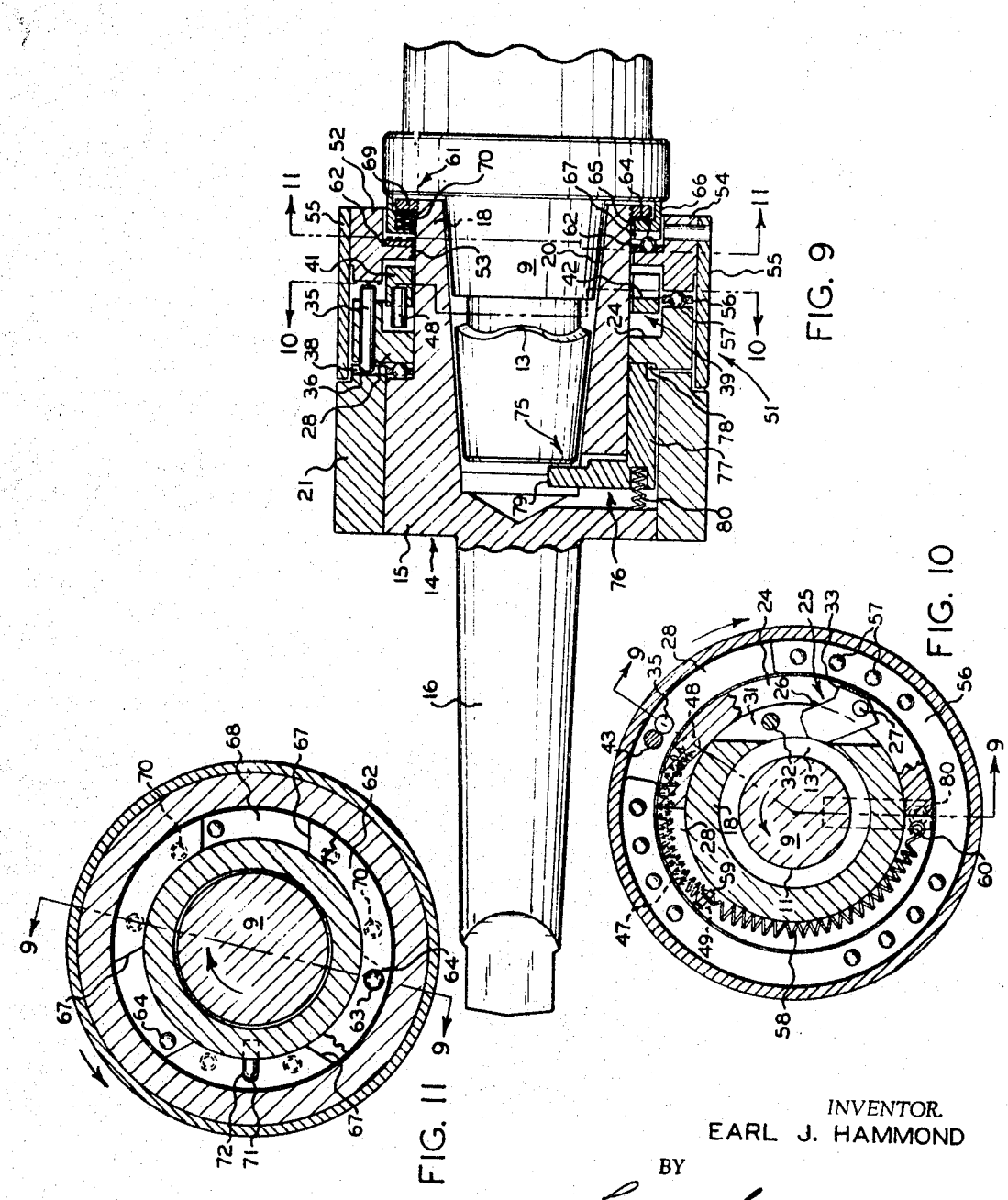

Aug. 13, 1968  E. J. HAMMOND  3,396,981
CHUCKING APPARATUS

Filed Jan. 18, 1965  5 Sheets-Sheet 5

INVENTOR.
EARL J. HAMMOND
BY
*Leaman, Leaman McCulloch*
ATTORNEYS

United States Patent Office 3,396,981
Patented Aug. 13, 1968

3,396,981
CHUCKING APPARATUS
Earl J. Hammond, Frankenmuth, Mich., assignor, by mesne assignments, to Houdaille Industries, Inc., Buffalo, N.Y., a corporation of Michigan
Filed Jan. 18, 1965, Ser. No. 426,177
26 Claims. (Cl. 279—89)

ABSTRACT OF THE DISCLOSURE

A chuck device for enabling rapid changing of tool holders and having a latch movable into and out of a groove in the tool holder in response to rotation of a rotary, latch operating member, the latch being movable from its nonlatching position to its latching position by engagement of the tool holder with an unlocking part mounted in the path of movement of the tool holder into the chuck and having an axially movable ejector operable to eject the tool holder from the chuck in response to movement of the rotary operator in a direction to move the latch from its latching position to its unlatching position.

---

This invention relates to chucking apparatus and more particularly to a chuck device that is especially adapted for use in supporting a tool holder or the like, and more particularly the invention relates to a precision chucking device which is operable to more rapidly enable insertion and removal of a tool holder or the like in the chuck device while the latter is rotating.

In the machining of workpieces, it frequently becomes necessary to substitute one cutting tool for another. The changing of tools can be facilitated if the substitution can be effected without appreciably slowing or stopping the rotation of the chuck device in which the holder for the substitute tool is to be introduced. Chuck devices of the general class to which the invention relates have been proposed heretofore, but to my knowledge have not been satisfactory in practice for a number of reasons. Some of the previously proposed devices of this general class require movement of a disengaging mechanism in one direction to effect removal of a tool holder and movement of the mechanism in the opposite direction to secure a substitute tool holder thereto. When a chuck device of this kind is rotating, it is difficult, if not impossible, to effect movement of the device and the releasing and securing mechanism in two directions of relative movement.

An object of this invention is to provide a readily and quickly releasable, positive drive chuck for a tool holder or the like wherein the parts have precision ground taper surfaces insuring substantially perfect concentricity and positive latching means reacting between the chuck device and the tool holder to lock the latter securely and rigidly in the chuck.

Another object of the invention is to provide a chuck device and tool holder which are so constructed as to enable the tool holder to be rapidly introduced and accurately secured in the chuck device without the necessity of any particular orientation of the tool holder to the chuck.

A further object of the invention is to provide a chuck device having releasable latch means operable to wedge a tool holder therein, and wherein the latch means may be moved out of the latching relation and the tool holder released by singular manually operated means during rotation of the assembled chuck and tool holder.

Another object of the invention is to provide a tool holder of the kind described wherein movement of the latch means to a disabled position effects locking of the latch means in a disabled position.

A further object of the invention is to provide a chuck device having means operable in response to the insertion of a tool holder therein to effect automatic movement of the latch means from a disabled position into a latching position relative to the tool holder.

Another object of the invention is to provide a chuck device wherein unlatching of the tool holder imposes an axial thrust on the tool holder in such direction as to eject it from the chuck.

Other objects and advantages of the invention will be pointed out specifically or will become apparent from the following description when it is considered in conjunction with the appended claims and the accompanying drawings, wherein:

FIGURE 4 is a fragmentary, longitudinal sectional view taken on the line 4—4 of FIGURE 3, including a portion of the tool holder and tool supported therein, and illustrating the chuck and tool holder in operative, assembled condition;

FIGURE 5 is a transverse sectional view taken on the line 5—5 of FIGURE 4;

FIGURE 6 is a transverse sectional view taken on the line 6—6 of FIGURE 4;

FIGURE 9 is a fragmentary, longitudinal sectional view taken on the line 9—9 of FIGURE 3 and illustrating the chuck and tool holder in condition for disassembly;

FIGURE 10 is a transverse sectional view taken on the line 10—10 of FIGURE 9;

FIGURE 11 is a transverse sectional view taken on the line 11—11 of FIGURE 9;

Figure 1:
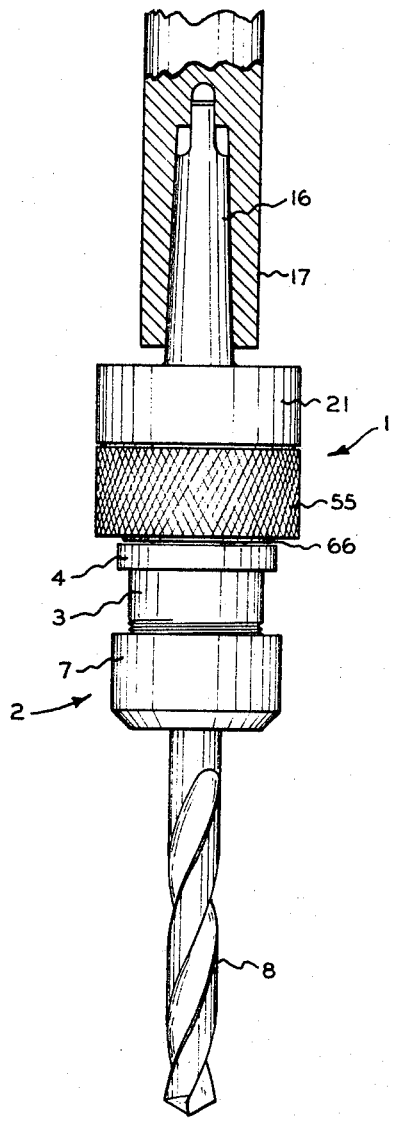
FIGURE 1 is a fragmentary, partly elevational and partly sectional view of a tool supporting chuck constructed in accordance with the invention and operatively assembled with a tool holder and a machine spindle.
Figure 2:
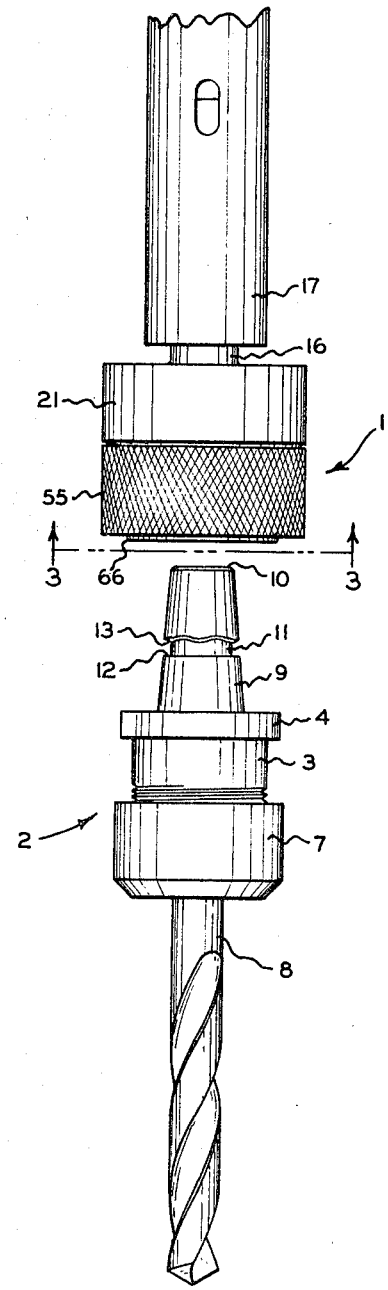
FIGURE 2 is a view similar to FIGURE 1, but illustrating the chuck and the tool holder disassembled.
Figure 7:
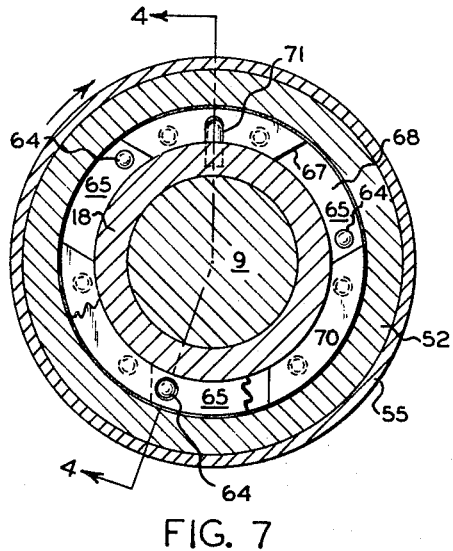
FIGURE 7 is a transverse sectional view taken on the line 7—7 of FIGURE 4.
Figure 8:
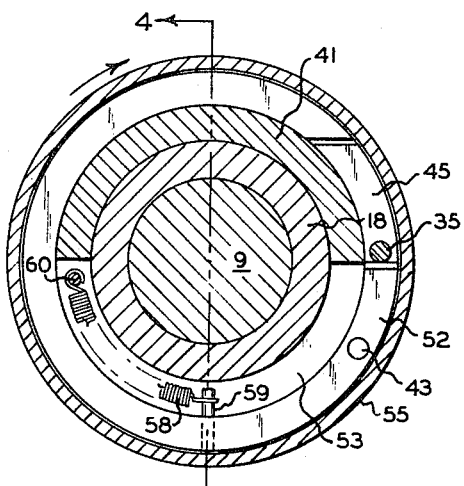
FIGURE 8 is a transverse sectional view taken on the line 8—8 of FIGURE 4.
Figure 3:
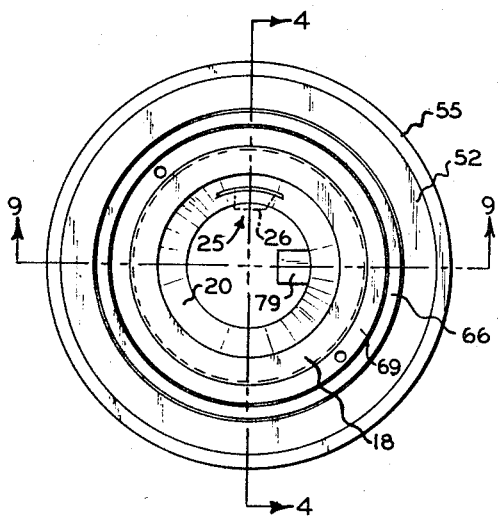
FIGURE 3 is an end elevational view of the chuck as viewed in the direction of the arrows 3—3 on FIGURE 2.

The arrows 4—4 in FIGURES 5, 6, 7 and 8, and the arrows 9—9 in FIGURES 10 and 11 are used to orient the transverse sectional views to FIGURES 4 and 9, respectively.

Apparatus constructed in accordance with the disclosed embodiment of the invention comprises a chuck device 1 that is adapted to clamp and unclamp a tool holder 2 therein. For illustrative purposes, the tool holder 2 is disclosed as comprising an annular body 3 terminating at one end in a flange 4 and having at its other end an outwardly diverging socket 5 (FIGURE 4) within which is a plurality of tool clamping members 6 which are adapted to move radially inwardly and outwardly in response to rotation of a collar 7 so as to clamp and release a tool such as a drill 8. Extending in the opposite direction from the flange 4 is a tapered shank 9 terminating in a flat, free end 10. Between its ends, the shank 9 is provided with an annular groove 11, the forward wall 12 of which is planar, and the rearward wall 13 of which is undulating so as to provide a cam surface for a purpose presently to be explained.

The chuck device 1 comprises a preferably cylindrical body 14 having an enlarged portion 15 terminating at one end in a tapered shank 16 adapted to be received in a rotatable spindle 17 of a machine tool. The body member 14 terminates at its other end in a reduced, cylindrical hub portion 18 which is externally threaded adjacent its free end as at 19 (see FIGURE 4). The members 15 and 18 are provided with an axially extending, outwardly diverging, conical cavity 20 in which the shank 9 of the tool holder is adapted to be received. The body member 14 is encircled by a sleeve 21 which is fixed to the portion 15 by a suitable means such as pins 22, one of which is shown in FIGURE 4. At its forward end, the sleeve 21 is reduced as at 23.

The chuck is provided with latch means designated generally by the reference character 25 and comprising a pawl 26 pivoted by means of a pin 27 to an inwardly extending, annular flange 24 forming part of a carrier or latch control ring 28 which is rotatably mounted on the member 18 adjacent the sleeve 21. Between the body portion 15 and the carrier ring 28 is a generally C-shaped cage 29 in which is mounted a plurality of ball bearings 30.

The pawl 26 is adapted to be pivoted from a position in which it projects into the cavity 20, as is indicated in FIGURES 4 and 6, to a position in which it is retracted from the cavity, as is indicated in FIGURE 10. To enable such movements of the pawl, the body portion 18 is provided with a chordal slot 31 in communication with the cavity 20. Spanning the sides of the slot 31 is a pin 32 (FIGURE 6) that is adapted to be engaged by a projection 33 on the pawl 26 to prevent rotation of the carrier ring 28 beyond a position in which the pawl 26 extends substantially radially of the longitudinal axis of the cavity 20.

Axially reciprocable in the carrier ring 28 is a drive transmitting or actuating pin 35 (FIGURES 6, 9 and 10) which is of greater length than the axial thickness of the ring. The rear end 36 of the pin 35 is adapted to bear against the forward face of the sleeve 21 so as to be capable of entering a notch 38 (FIGURE 9) formed in the forward face of the member 21. The purpose and function of these elements will be referred to hereinafter.

Figure 12:
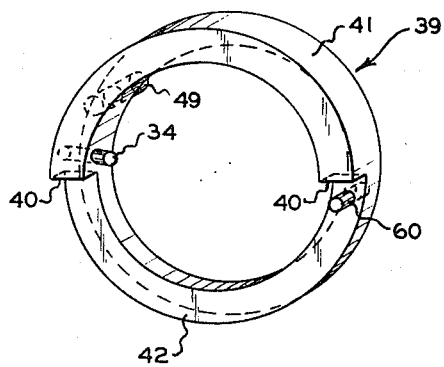
FIGURE 12 is a perspective view of a part of the apparatus.

Forwardly of the carrier member 28 is an annular member 39 which is fixed to the body portion 18 by means of a pin 34 (FIGURES 6 and 12). The rear face of the member 39 is planar, but its forward face is cut away along a diametral line as at 40 so as to provide a semicircular portion 42 of lesser axial thickness. Mounted in the thicker portion 41 is an axially extending pin 49 which projects rearwardly toward the flange 24 of the carrier ring 28. Abutting the pin 49 is one end of a compression spring 47 (see FIGURES 6 and 10). The other end of the spring 47 abuts a forwardly extending post 48 that is fixed to the carrier ring 28. The spring 47 reacts between the members 48 and 49 and constantly biases the carrier ring to rotate in a counterclockwise direction, as viewed in FIGURE 6.

Operating means designated generally by the reference character 51 is provided for effecting rotation of the member 28 relative to the body 15. The operating means 51 comprises an annular ring 52 having a radially inwardly projecting flange or rib 53 rotatably mounted on the body portion 18. Fixed to the periphery of the ring 52 by suitable means such as pins, one of which is shown at 54 in FIGURE 9, is a sleeve 55 which projects rearwardly and overlies the carrier ring 28 and the reduced diameter portion 23 of the ring 21. Sufficient clearance is provided between the sleeve 55 and the members 28 and 23 so as to enable free rotation of the ring 52 relative to the members 21 and 28. Between the confronting surfaces of the ring 52 and the ring 28 is a generally C-shaped cage 56 in which is mounted a plurality of ball bearings 57.

A tension spring 58 (see FIGURES 6 and 10) is interposed between the ring members 52 and 39 in the space provided by the reduced thickness portion 42 of the ring 39. One end of the spring 58 is anchored to a radially projecting pin 59 (FIGURES 4 and 6) that is secured to the ring 52 and the other end of the spring is secured to an axially projecting pin 60 which is secured to the portion of the member 39. The arrangement is such that the spring 58 constantly exerts a force on the operating means 51 tending to rotate it in one direction relatively to the body 15 so as yieldably to maintain the members 52 and 39 in the relative positions indicated in FIGURE 6. The spring 58 is capable of expanding so as to enable rotation of the ring 52 clockwise from the position shown in FIGURE 6 to the position shown in FIGURE 10. As the ring 52 is rotated in the clockwise direction, a second drive transmitting pin 43 (FIGURES 6 and 10) mounted in the ring 52 will engage the pin 35 mounted in the carrier ring 28 and drive or rotate the latter to the position shown in FIGURE 10. Such rotation of the ring 28 will pivot the latch pawl 26 out of the cavity 20.

Ejecting means 61 (FIGURES 9 and 11) is mounted on the forward end of the body portion 18 for axial movements in response to rotation of the operating means 51. The ejecting means comprises an annular cage or carrier 62 loosely received on the body portion 18 and abutting the flange 53 of the ring 52. Formed in the carrier 62 is a plurality, e.g., three, openings 63 and in each of which is received a roll 64 of greater diameter than the thickness of the member 62, enabling each ball to roll upon the flange 53 and project forwardly beyond the carrier 62. Adjacent the carrier 62 and loosely received on the forward end of the body portion 18 is a thrust ring 65 having a forwardly projecting flange or rim 66. The rear surface of the ring 65 is provided with a number of recesses 67 corresponding to the number of rolls 64. Each recess 67 has a base 68 which is axially inclined so as to be deeper at one end than at the other. Each recess, therefore, forms a cam surface. The ring 65 is so oriented with respect to the rolls 64 that each recess accommodates one of the rolls.

A retaining nut 69 is threaded on the threaded end 19 of the body portion 18 so as to maintain the parts of the apparatus assembled. Between the nut 69 and the ring 65 reacts a plurality of compression springs 70 which constantly urge the ring 65 in an axially rearward direction, thereby maintaining contact between the balls 64 and the inclined surfaces 68 of the respective recesses 67. Relative rotation between the thrust member 65 and the body member 15 is prevented by a radially projecting pin 71 which is received in a radially extending notch 72 formed in the member 65.

As has been pointed out hereinbefore, the latch pawl 26 is movable from a projected or latching position to a retracted position in response to rotation in one direction of the control ring 28. In the preferred embodiment, releasable locking means is provided for holding the pawl in its retracted position. The locking means is designated generally by the reference character 75 (see FIGURE 9) comprising a generally L-shaped member 76 mounted in an opening formed in the body member 15 and having an axially extending lock arm 77 the forward end of which is adapted to be received in a radially extending slot 78 formed in the rear surface of the carrier ring 28. The member 76 also includes a radially projecting operating arm 79 which extends into the cavity 20 in a position to be engaged by the end 10 of the shank 9 of the tool holder 2 when the latter is introduced to the cavity. The member 76 is constantly urged in a forward or locking direction by a compression spring 80 which reacts between the body member 15 and the member 76.

*Operation*

Assume that the chuck apparatus 1 is clamped in the rotating spindle 17 and that the tool holder 2 supports a tool 8 and is fixed in the chuck device 1 as is shown in FIGURES 1 and 4. Assume also that the spindle 17 rotates the chuck device 1 in a counterclockwise direction, as is viewed in FIGURE 6. The tool holder 2 and the ring 55, therefore, will rotate in the directions of the arrows a and b, respectively, as indicated in FIGURE 6.

Referring now particularly to FIGURES 4, 6 and 13–20, FIGURES 4, 6, 13 and 14 indicate the positions of the parts when they are assembled and are rotating so as to enable the tool 8 to perform cutting operations upon a workpiece. When it is desired to uncouple the tool holder 2 and the tool supported thereby from the chuck device 1 the operator grasps the sleeve 55, while the spindle 17 continues to rotate, so as to effect relative rotation between the operating ring 52 and the body 15. In effect, therefore, the members 16 and 52 rotate in opposite directions, as is indicated by the arrows a and b in FIGURE 13.

Figure 13:
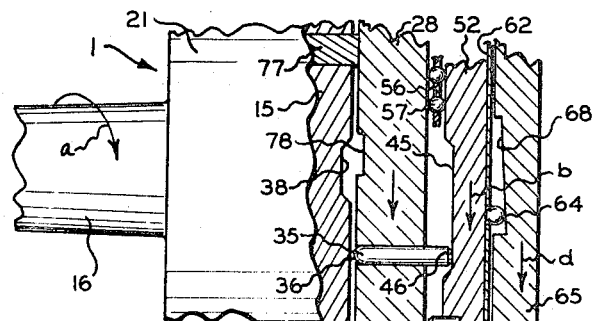
FIGURE 13 is a partly side elevational, partly sectional, diagrammatic view of certain parts of the chuck apparatus illustrating their relative positions when in condition to clamp a tool holder therein.
Figure 14:
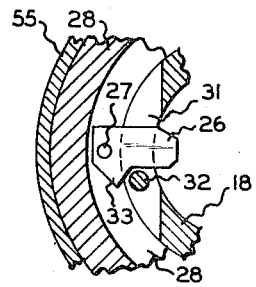
FIGURE 14 is a fragmentary, transverse sectional view of the parts shown in FIGURE 13.
Figure 15:
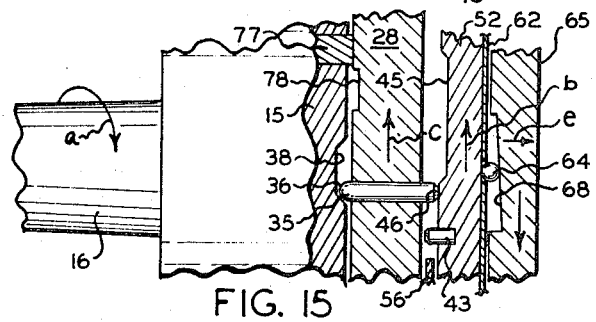
FIGURES 15, 16, 17, 18, 19 and 20 are diagrammatic views similar to FIGURES 13 and 14, respectively, and illustrating the parts in various positions of adjustment.
Figure 16:
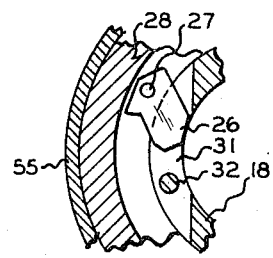

As the members 52 and 16 rotate relatively to one another, i.e., when the operator grasps the sleeve 55, the end 46 of the pin 35 abuts the inclined end wall of the slot 45 in the ring 52, whereas the other end 36 of the pin 35 is held against the adjacent face of the body member 15, as is shown in FIGURE 13, thereby enabling the members 52 and 28 to rotate conjointly relatively to the body 15, in the direction indicated by the arrows b and c in FIGURE 15, until such time as the end 36 of the pin 35 is enabled to enter the recess 38 in the body member 15. The relative rotation of the carrier member 28 and the body member 15 will cause the latch pawl to be rotated from the projected position shown in FIGURES 4, 6 and 14 to the retracted position shown in FIGURES 9, 10 and 16.

Following the rotation of the ring 28 to such position as to permit the pin 35 to enter the recess 38, further relative rotation between the members 52 and 15 causes the end 46 of the pin 35 to be withdrawn from the recess 45 (see FIGURE 15), thereby enabling relative rotation between the members 28 and 52. Such relative rotation may continue until the drive pin 43 engages the end 46 of the pin 35 (see FIGURE 17), whereupon the movement of the member 52 relative to the member 15 once again is imparted to the carrier member 28 so as to move the latter into such position that the lock arm 77 may enter the notch 78 under the force of the spring 80. (See FIGURE 17.) Upon entry of the arm 77 into the notch 78, relative rotation between the members 28 and 15 is precluded.

Figure 17:
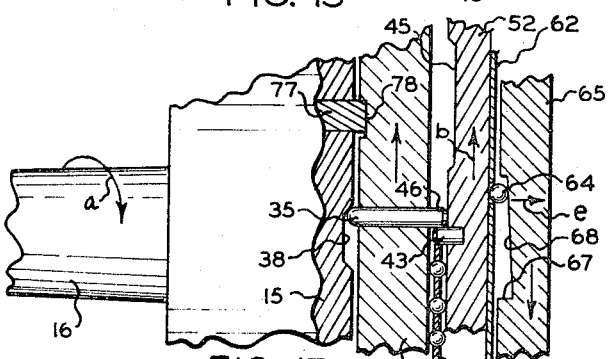
Figure 18:
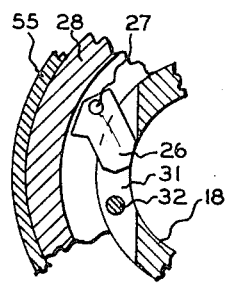
Figure 19:
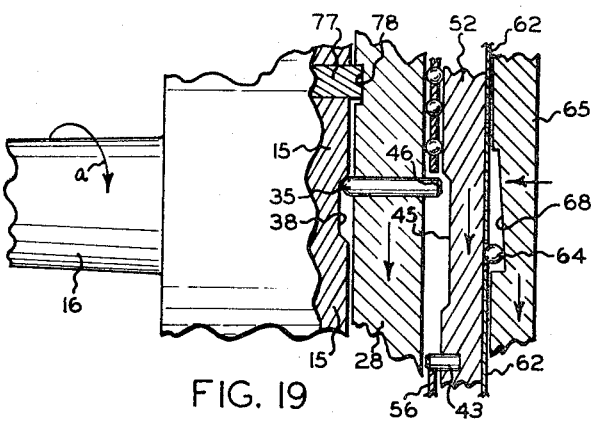
Figure 20:
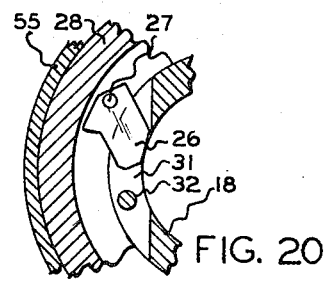

During the rotation of the carrier 28 relative to the member 15 by the member 52, the ejector ring 65 continues to rotate with the member 15 and relatively to the operating member 52, thereby causing the rolls 64 to move from the deeper ends of the cam recesses 67 (FIGURE 7) toward the shallower ends (FIGURE 11), thereby transmitting to the ejector ring 65 an axial force in the direction of the arrow e in FIGURE 17 causing the ejector ring 65 to engage the flange 4 on the tool holder 2 and exert an axially outward force on the latter so as to break the taper seal between the shank 9 and the cavity 20. As will be apparent from FIGURES 13–17, the maximum ejecting force that can be exerted by the rolls 64 on the ring 65 is not applied until such time as the latch pawl 26 has been pivoted to a retracted position. To avoid any possibility of interference between the latch pawl 26 and the surface 13 of the groove 11, however, the rear edge of the pawl preferably is rounded as is indicated at 26a in FIGURE 4.

Following the exertion of the ejecting force on the tool holder by the ejecting ring 65, the operator may release the operating means 51 and withdraw the tool holder 2 from the cavity of the chucking device. Upon release of the operating means 51, the spring 58 will contract, thereby rotating the operating ring 52 in the same direction of rotation as the body 15 is rotated by the spindle 17, so as to return the ring 52 to the position shown in FIGURE 17. The carrier ring 28, however, will not rotate with the ring 52 because of the engagement of the locking arm 77 with the notch 78. Thus, the latch pawl 26 will remain in its retracted position. Moreover, since the carrier member 28 remains in its adjusted position, the spring 47 continues to be compressed between the pins 48 and 49 and biases the ring 28 to rotate to its original position.

Return rotation of the operating ring 52 to its original position will effect movement of the force transmitting rolls 64 to the deeper ends of the recesses 67, thereby enabling the springs 70 to move the ejector ring 65 axially in a rearward direction.

To reassemble the chucking device and the tool holder 2, the shank 9 of the latter may be introduced to the cavity while the chuck device continues to rotate. As the shank 9 moves axially rearwardly of the body 15, the end 10 of the shank will engage the operating arm 79 and displace the locking member 76 rearwardly so as to withdraw the arm 77 from the notch 78. Upon removal of the arm 77 from the notch 78, the spring 47 will expand, reacting between the pins 48 and 49, and effect rotation of the carrier member 28 in a counterclockwise direction, as viewed in FIGURE 10, thereby causing movement of the nose of the pawl 26 into engagement with the pin 32. Engagement of the pawl and the pin 32 will cause the latter to exert a force on the pawl to rock it to its projected position in the cavity 20 for reception in the groove 11. The pawl 26 will react with the cam surface 13 so as to assure a tight fit of the shank 9 within the cavity 20.

The tapers to which the shank 9 and the cavity 20 are formed, and the relative positions of the groove 11 and the pawl 26, are such that when the tool holder 2 is firmly seated in the cavity of the chucking device a small clearance 82 (see FIGURE 4) is provided between the flange 4 and the ejector ring 65, thereby avoiding any possibility that the tool holder will be imperfectly clamped in the chuck device.

The disclosed embodiment is representative of a presently preferred form of the invention, but is intended to be illustrative rather than definitive thereof. The invention is defined in the claims.

What is claimed is:

1. Chucking apparatus comprising a body member adapted for rotation about an axis; latch means supported by said body member for movements radially of said axis from a radially retracted position to a radially projected position; rotary operating means supported by said body member for rotation relative thereto; drive transmitting means interconnecting said operating means and said latch means for moving the latter from one of said positions to the other; ejecting means supported by said body member for axial movements relative thereto; and means responsive to rotation of said operating means for moving said ejecting means axially.

2. Chucking apparatus comprising a body adapted for rotation about an axis and having an axial cavity therein for reception of one end of a tool holder; latch means supported by said body for movements radially of said axis into and out of said cavity; operating means for moving said latch means into said cavity; latch locking means acting on said operating means for locking said latch means in a position out of said cavity; means mounting said locking means in said cavity for engagement by said tool holder; and drive transmitting means acting on said operating means for moving said latch means into said cavity in response to engagement of said locking means by said tool holder.

3. Chucking apparatus comprising a body adapted for rotation about an axis and having an axial cavity therein for reception of a tool holder; latch means supported by said body for movements radially of said axis into and out of said cavity; operating means supported by said body for rotation relative thereto; drive transmission means interconnecting said operating means and said latch means for moving the latter radially out of said cavity in response to rotation of said operating means in one direction relative to said body; ejecting means supported by said body for axial movements in directions toward and away from engagement with said tool holder; and means interconnecting said ejecting means and said operating means for moving said ejecting means in a direction toward said tool holder in response to rotation of said operating means relative to said body in said one direction.

4. Chucking apparatus comprising a body adapted for rotation about an axis and having an axial cavity therein for the reception of one end of a tool holder; latch means; control means connected to said latch means for moving the latter radially of said axis into and out of said cavity; locking means supported by said body for engagement with said control means to lock said latch means out of said cavity; and operating means connected to said locking means and extending into said cavity for engagement with and displacement by said tool holder, displacement of said operating means effecting disengagement of said locking means and said operating means, whereby said control means is enabled to effect movement of said latch means into said cavity.

5. The apparatus set forth in claim 4 including spring means acting on said control means and constantly urging the latter to move said latch means into said cavity.

6. The apparatus set forth in claim 4 including spring means acting on said operating means and constantly urging the latter toward locking engagement with said control means.

7. Chucking apparatus comprising a body adapted for rotation about an axis and having an axial cavity therein terminating in an open end, said cavity being adapted for the reception of one end of a tool holder; latch means movable into and out of said cavity for selectively preventing and permitting removal of said tool holder from said cavity; an ejecting member for ejecting a tool holder from said cavity; means mounting said ejecting member adjacent said open end of said cavity for movement in the direction of said open end; an operating member mounted on said body for rotation relative thereto; drive transmitting means interconnecting said operating member and said latch means for moving the latter out of said cavity in response to rotation of said operating member in one direction; and force transmitting means interposed between said operating member and said ejecting member and operable to move the latter toward said open end in response to rotation of said operating member in said one direction relative to said body.

8. The apparatus set forth in claim 7 wherein one of said members has a cam surface thereon and wherein said force transmitting means comprises rotatable means in engagement with said cam surface and with the other of said members.

9. The apparatus set forth in claim 7 including spring means reaching between said body and said ejecting member and urging the latter to move in a direction opposite to said one direction.

10. Chucking apparatus comprising a body adapted for rotation about an axis and having an axial cavity therein for the reception of one end of a tool holder; a carrier member mounted on said body for rotation relative thereto; latch means mounted on said carrier member for movement into and out of said cavity in response to relative rotation of said body and said carrier member; an operating member mounted on said body for rotation relative thereto; motion transmission means interconnecting said operating member and said carrier member for rotating the latter in response to relative rotation of said operating member and said body; and releasable lock means carried by said body and engageable with said carrier member for releasably locking the latter in one position of rotative adjustment relative to said body.

11. The apparatus set forth in claim 10 including means reacting between said body and said operating member for urging the latter to rotate in one direction relative to said body.

12. The apparatus set forth in claim 10 including means reacting between said operating member and said carrier member for urging the latter to rotate in one direction relative to said body.

13. The apparatus set forth in claim 12 including means reacting between said body and said carrier member for urging the latter to rotate in said one direction relative to said body.

14. The apparatus set forth in claim 10 including lock operating means supported by said body for engagement by said tool holder; and means interconnecting said lock operating means and said locking means for releasing the latter.

15. The apparatus set forth in claim 10 including an ejector member mounted on said body for axial movement relative thereto; and means reacting between said operating member and said ejector member for moving the latter axially in response to relative rotation of said body and said operating member.

16. A chuck and tool holder construction comprising a body having an axially extending cavity therein; a tool holder having a shank at one end removably received in said cavity; said shank having an annular groove therein located between the ends of said cavity; a carrier member mounted on said body for rotation relative thereto; latch means mounted on said carrier member for movement into and out of said groove in response to relative rotation of said body and said carrier member; operating means mounted on said body for rotation relative thereto; means for transmitting rotation of said operating means to said carrier member; an ejector member mounted on said body for movement axially of said cavity in a direction into engagement with said tool holder; and motion transmission means for moving said ejector member in said direction in response to rotation of said operating means.

17. The construction set forth in claim 16 wherein said groove has a cam surface for wedging engagement with said latch means.

18. The construction set forth in claim 16 including releasable locking means reacting between said body and said carrier member for locking the latter in one position of rotative adjustment relative to said body.

19. The construction set forth in claim 18 including lock release means engageable with said tool holder; and means interconnecting said release means and said locking means for disabling the latter.

20. A chuck and tool holder construction comprising a body having an axially extending cavity therein; a tool holder having a shank at one end removably received in said cavity; said shank having an annular groove therein located between the ends of said cavity; a carrier member mounted on said body for rotation relative thereto; latch means pivotally mounted on said carrier member for pivotal movement into and out of said groove in response to relative rotation of said body and said carrier member; operating means mounted on said body for rotation relative thereto; and means for transmitting rotation of said operating means to said carrier member.

21. Chucking apparatus comprising a body member adapted for rotation about an axis and having a cavity therein for reception of a tool holder; carrier means mounted on said body member for rotation relative thereto; operating means mounted on said body member for rotation relative thereto and relative to said carrier means; axially movable actuating means reacting between said operating means and said carrier means for imparting rotation to the latter in response to rotation in one direction of said operating means relative to said body member; latch means carried by said carrier means and normally extending into said cavity; and means acting on said latch means in response to conjoint rotation of said operating means and said carrier means for moving said latch means out of said cavity.

22. The apparatus set forth in claim 21 including means acting on said operating means and biasing the latter to rotate in a direction opposite to said one direction.

23. The apparatus set forth in claim 21 including means acting on said carrier means and biasing the latter to rotate in a direction opposite that in which said carrier means is moved by said operating means.

24. The apparatus set forth in claim 21 including lock means acting between said body member and said carrier means for locking the latter in a position of rotary adjustment relative to said body member and in which position said latch means is out of said cavity.

25. The apparatus set forth in claim 24 including axially movable lock release means carried by said body member for releasing said lock means.

26. The apparatus set forth in claim 21 including ejecting means mounted on said body member for axial movement; and means responsive to rotation of said operating means for effecting axial movements of said ejecting means.

References Cited

UNITED STATES PATENTS

| | | | |
|---|---|---|---|
| 1,812,221 | 6/1931 | Spencer | 279—33 |
| 3,179,450 | 4/1965 | Recker | 279—107 |
| 1,024,172 | 4/1912 | Bergsten | 279—81 |
| 1,285,866 | 11/1918 | Wilson. | |
| 2,478,382 | 8/1949 | Fischer. | |
| 2,931,660 | 4/1960 | Barwinkel. | |
| 2,948,559 | 8/1960 | Recker. | |

FOREIGN PATENTS 399,266   7/1924   Germany.

ROBERT C. RIORDON, *Primary Examiner.*

D. R. MELTON, *Assistant Examiner.*